(12) United States Patent
Zaharia et al.

(10) Patent No.: US 7,558,432 B2
(45) Date of Patent: Jul. 7, 2009

(54) ADAPTIVE QUANTIZATION OF DEPTH SIGNAL IN 3D VISUAL CODING

(75) Inventors: Ramona Zaharia, Guildford (GB); Leszek Cieplinski, Guildford (GB); Miroslaw Bober, Guildford (GB)

(73) Assignee: Mitsubishi Electric Corporation, Guildford, Surrey (GB)

( * ) Notice: Subject to any disclaimer, the term of this patent is extended or adjusted under 35 U.S.C. 154(b) by 791 days.

(21) Appl. No.: 11/110,764

(22) Filed: Apr. 21, 2005

(65) Prior Publication Data

US 2005/0244071 A1 Nov. 3, 2005

(30) Foreign Application Priority Data

Apr. 29, 2004 (EP) .................................. 04252510

(51) Int. Cl.
*G06K 9/00* (2006.01)
*G06K 9/46* (2006.01)
(52) U.S. Cl. .................. 382/251; 382/154; 382/239; 382/168
(58) Field of Classification Search ............. 382/251, 382/154, 239, 168
See application file for complete search history.

(56) References Cited

U.S. PATENT DOCUMENTS 5,644,651 A * 7/1997 Cox et al. .................... 382/154

6,055,330 A 4/2000 Eleftheriadis et al.
6,104,837 A * 8/2000 Walker ........................ 382/239
6,671,419 B1 * 12/2003 Martins ....................... 382/274

FOREIGN PATENT DOCUMENTS

WO WO0233978 A1 * 4/2002

OTHER PUBLICATIONS

"A Depth Map Representation for Real-Time Transmission and View-Based Rendering of a Dynamic 3D Scene," Chai et al., *Proceedings of the First International Symposium on 3D Data Processing Visualization and Transmission*, 2002.
"Context Modeling Based Depth Image Compression for Distributed Virtual Environment," Bao et al., *Proceedings of the 2003 International Conference on Cyberworlds*, 2003, pp. 1-7.
"Estimation of Depth Fields Suitable for Video Compression Based on 3-D Structure and Motion of Objects," Alatan et al., *IEEE Transactions on Image Processing*, vol. 7, No. 6, Jun. 1998, pp. 904-908.
"Joint Estimation and Optimum Encoding of Depth Field for 3-D Object-Based Video Coding," Alatan et al., *IEEE*, 1996, pp. 871-874.
"Object-Based Coding of Stereo Image Sequences Using Joint 3-D Motion/Disparity Compensation," Tzovaras et al., pp. i-34.

(Continued)

*Primary Examiner*—John B Strege
(74) *Attorney, Agent, or Firm*—Birch, Stewart, Kolasch & Birch, LLP

(57) ABSTRACT

A method of representing an image or sequence of images using a depth map comprises transforming an n-bit depth map representation into an m-bit depth map representation, where m<n, using a non-linear transformation.

21 Claims, 5 Drawing Sheets

OTHER PUBLICATIONS

Figure 1:
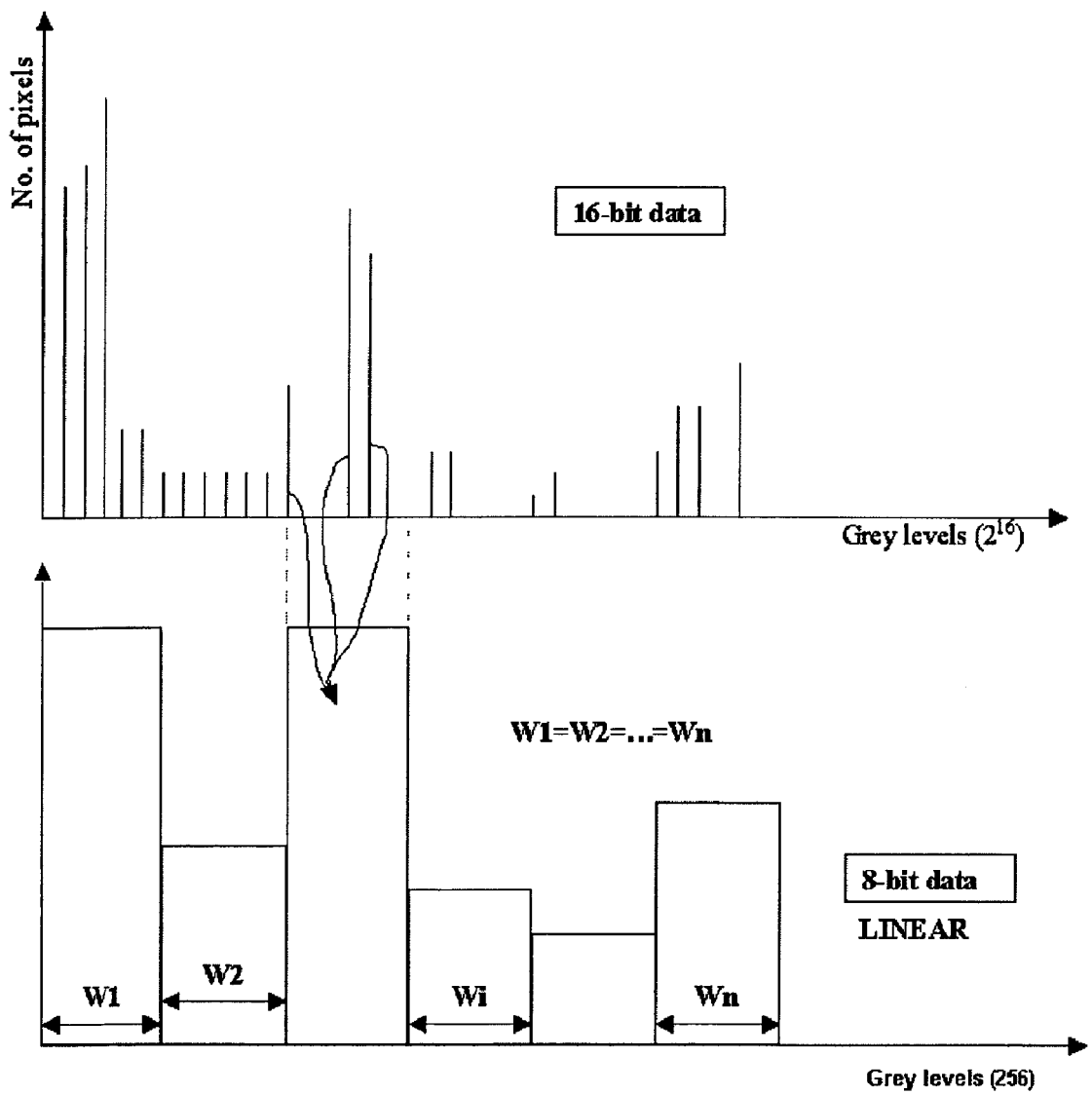

"Disparity Field and Depth Map Coding for Multiview 3D Image Generation," Tzovaras et al., *Signal Processing: Image Communication 11*, 1998, pp. 205-230.

"Compression and Transmission of Depth Maps for Image-Based Rendering," Krishnamurthy et al.

*JPEG2000: Image Compression Fundamentals, Standards and Practice*, Taubman and Macellin, pp. 98-101.

* cited by examiner

PRIOR ART

ADAPTIVE QUANTIZATION OF DEPTH SIGNAL IN 3D VISUAL CODING

This invention addresses efficient quantization of depth map data before the encoding. A depth map is an image with "per-pixel" depth information, giving the distance of each captured 3D point from the centre of the camera. This can be captured with an IR range camera or obtained through various means of image processing tools from a 3D content-based image (referring to depth map evaluated from the estimated disparity field or by using motion analysis in monoscopic images). The input depth map may have either floating point or integer number representation. For the integer number representation, for instance, an n-bit depth image will store depth information as n-bit grey-values, with the grey-level 0 defining the furthest value and the grey-level $2^n-1$ defining the closest value.

Various methods have been proposed for efficient encoding and transmission of 8-bit depth data associated to still images or a moving image sequence.

Two methods for coding isolated depth map are described in D. Tzovaras, N. Grammalidis, and M. G. Strintzis, "Disparity field and depth map coding for multiview 3D image generation", Image Communication, Vol. 11, No. 3, January 1998. In the first, depth maps are quantized and coded as if they were intensity images (I-frames) using the JPEG coding technique. In the second method, a wireframe model is adapted to the depth map information. Initially the wireframe model is fit in each B×B block of the object area. The block size is reduced successively as to obtain an adequate approximation of the depth information in this area.

Coding of depth map sequences is achieved in D. Tzovaras, N. Grammalidis, and M. G. Strintzis, "Disparity field and depth map coding for multiview 3D image generation", Image Communication, Vol. 11, No. 3, January 1998, by using a 2D motion compensation method. In this case, an MPEG-like scheme for the coding of depth maps can be employed.

An object-based coder is described in D. Tzovaras, N. Grammalidis, and M. G. Strintzis, "Object-based coding of stereo image sequences using joint 3D motion/disparity compensation", *IEEE Trans. On Video Technology*, Vol. 7, No. 2, April 1997, for the coding of the left channel of a 3D stereo image sequence. The 3D motion parameters (three translational and three rotational) are used for coding of depth maps as well as intensity images. For the first frame of the sequence, the depth map is coded and transmitted using a method for isolated depth maps. For the rest of the frames, a prediction of the current depth map is formed using the previous in time depth map along with the 3D motion parameters.

In A. Alatan and L. Onural, "Joint estimation and optimum encoding of depth field for 3D object-based video coding", Proc. *IEEE ICIP 96*, Lausanne, Switzerland, September 1996, vol. II, pp. 871-874 and A. Alatan and L. Onural, "Estimation of depth fields suitable for video compression based on 3D structure and motion of objects", *IEEE Transactions on Image Processing*, no. 6, June 1998, a method for coding the depth field of the moving objects in the scene is discussed. Using two intensity frames and 3D motion parameters as inputs, an encoded depth field can be obtained by jointly minimizing a distortion criteria and a bit-rate measure.

Finally, the MPEG-4 standard is proposed for the transmission of the depth maps offering sufficient freedom within this standard to provide extra depth enhancement layers. In MPEG-4 visual Version 2, the MAC (Multiple Auxiliary Components) was added in order to describe the transparency of the video object. Moreover, MAC was defined for a video object plane (VOP) on a pixel-by-pixel basis and contains data related to the video object, such disparity, depth and additional texture.

In R. Krishnamurthy, B. Chai, H. Tao and S. Sethuraman, "Compression and transmission of depth maps for image-based rendering", *Proc. of International Conference on Image processing (ICIP'2001)*, Thessaloniki, Greece, October 2001, a Region of Interest (ROI)-based coding is described. In this approach, ROI can be obtained from the depth estimation algorithm and reflect the confidence and accuracy of the depth-map in that particular region or generated by running an edge detector on the depth map. JPEG-2000 provides the means of selectively encoding ROI's using the maxshift. In this technique, the coefficients belonging to the ROI are shifted such that their bit-planes do not overlap with the non-ROI coefficients. This ensures that the ROI is first completely encoded, and then if bits are left over, the non-ROI regions are encoded. At the decoder the ROI coefficients can be implicitly identified from their shifted values, and thus no shape information needs to be explicitly transmitted to the decoder.

All the references above refer to depth map coding process where the data to be encoded is "adapted" to be suitable video encoder input; which typically involves quantization to 8-bit.

U.S. Pat. No. 6,055,330 describes a video compression technique, which make use of three-dimensional shape information as part of the video segmentation and compression processes. This method identifies separate objects using depth information corresponding to a field or frame of video sequence. It provides an object segmentation circuit for receiving depth information of a frame or video sequence; identifies one or more separate objects within the frame and converts the depth information into an object map. Each object map is associated to each depth region by a masking circuit. In one of the approaches the objects are identified from the histogram of the depth information. Thus the number of pixels with a predetermined depth values are selected based on a threshold value used and a clipped histogram is generated. The new histogram is scanned to find the boundaries of n regions with n different threshold depth values and a variable step quantization circuit is used to quantize the depth information in order to generate the object map. Once identified, the objects are sent as input to the MPEG-4 encoder.

U.S. Pat. No. 6,104,837 proposes a method for depth compression, which identifies the patches of pixels in the depth image with all pixels in the patch having the same or similar depth values. The algorithm involves a merging procedure in order to create the final sized patches and exclude areas where it is known that no depth data will be required. First, patches of adjoining pixels of the image are determined within a first predetermined range and a first common depth value is assigned to all pixels of the patch. For each discrete pixel depth value, the corresponding number of pixels is calculated and, the smallest patches are eliminated by re-assigning the nearest existing discrete depth value to them. This step is repeated until a predetermined number N of discrete depth values remains.

A common method adopted for quantizing n-bit depth image to m-bit depth image (with n>m) based on histogram analysis is described below. We define linear quantization as a method of mapping the pixels from n-bit to m-bit (with n>m) representation, using a linear function, where m is for example the number of bits used by a standard codec. This function is defined as division by a constant.

$$F(x) = \frac{x}{2^n/2^m} \quad (1)$$

We define linear de-quantization as a method of mapping the pixels from m-bit to n-bit (with n>m) representation using a linear function. This function is defined as multiplication by a constant.

$$F(x)=x*(2^n/2^m) \quad (2)$$

As an example, the pixels mapping process from 16-bit data to 8-bit data is graphically illustrated in FIG. 1. The initial 16-bit per pixel representation corresponds to $2^{16}$ grey level values, which are to be grouped into 256 equally spaced bins. For each of the 256 bins the width of the bin will be the same, while the number of pixels in each bin varies.

In the de-quantization process, a new grey level value is allocated for all the pixels belonging to each of the 256 bins. The new grey level value is calculated as the average bin value in the 8-bit histogram multiplied by 256.

Figure 2:
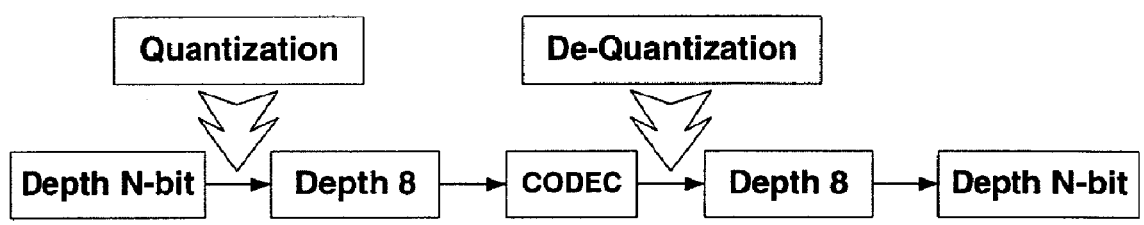

An illustrative block diagram of the application scenario is given in FIG. 2. The n-bit depth map is first quantized to 8-bit to be compatible to a standard encoder. After encoding/decoding process, the depth data is de-quantized back to n-bit representation.

Additionally, in R. Krishnamurthy, B. Chai, H. Tao and S. Sethuraman, "Compression and transmission of depth maps for image-based rendering", *Proc. of International Conference on Image processing (ICIP'2001)*, Thessaloniki, Greece, October 2001, a method for reshaping dynamic range of depth in order to reflect the different importance of different depths is proposed. This approach is based on the observation that the errors were much more significant in the areas of smaller depth (larger k), therefore, reshaping the dynamic range of depth is done using a similar idea to companding, which is used in encoding speech signals. First the depth map is scaled to a value [0,1]. Then the depth-map is passed through a function that expands the dynamic range for higher k's and compresses the dynamic range for lower k's (Note that this is opposite to the action of a traditional compander used in speech).

The function used for reshaping in this example is the quadratic function from (1).

$$k'=ak+(1-a)k^2 \quad (3)$$

Then k' values are encoded using the JPEG-2000 algorithm after scaling this floating point number to a 16-bit number.

The invention addresses the problem of quantization of the depth data accompanying a video or graphics image prior to coding in order to exploit the distribution of objects in the scene, especially non-linear distribution. For example, some depth values may not appear at all in the scene while others need to be more finely quantized than would be the case with linear quantization of the whole scene.

In contrast to the idea in U.S. Pat. No. 6,055,330, no objects map associated to the different values of depth in the image is created.

Unlike U.S. Pat. No. 6,104,837, we do not identify patches of importance in the depth image and eliminate areas considered to be unimportant.

Our approach takes into account the depth image as a whole without performing explicit segmentation of the objects against the background.

The invention also addresses the problem of de-quantization of depth data consisting of re-mapping the pixels back from m-bit to n-bit (with n>m) representation.

Aspects of the invention are set out in the accompanying claims.

A non-linear piecewise function is derived from the distribution of the depth data accompanying a video or graphics image, in order to create a suitable mapping to lower precision acceptable by a standard video encoder. Unlike the linear approach, the non-linear mapping takes into account the actual depth values occurring in the scene and creates a suitable mapping relation to displacement and extraction. The inventive idea also addresses non-linear de-quantization following the encoding/decoding process, where the m-bit depth data is re-mapped to n-bit data (with n>m) using an appropriate reconstruction value calculated for each bin.

We consider a number of approaches to the problem that offer different trade-offs between efficiency and complexity and may be applicable in different application scenarios (different type of images computer-generated or natural images). These are described in the following section.

Figure 3:
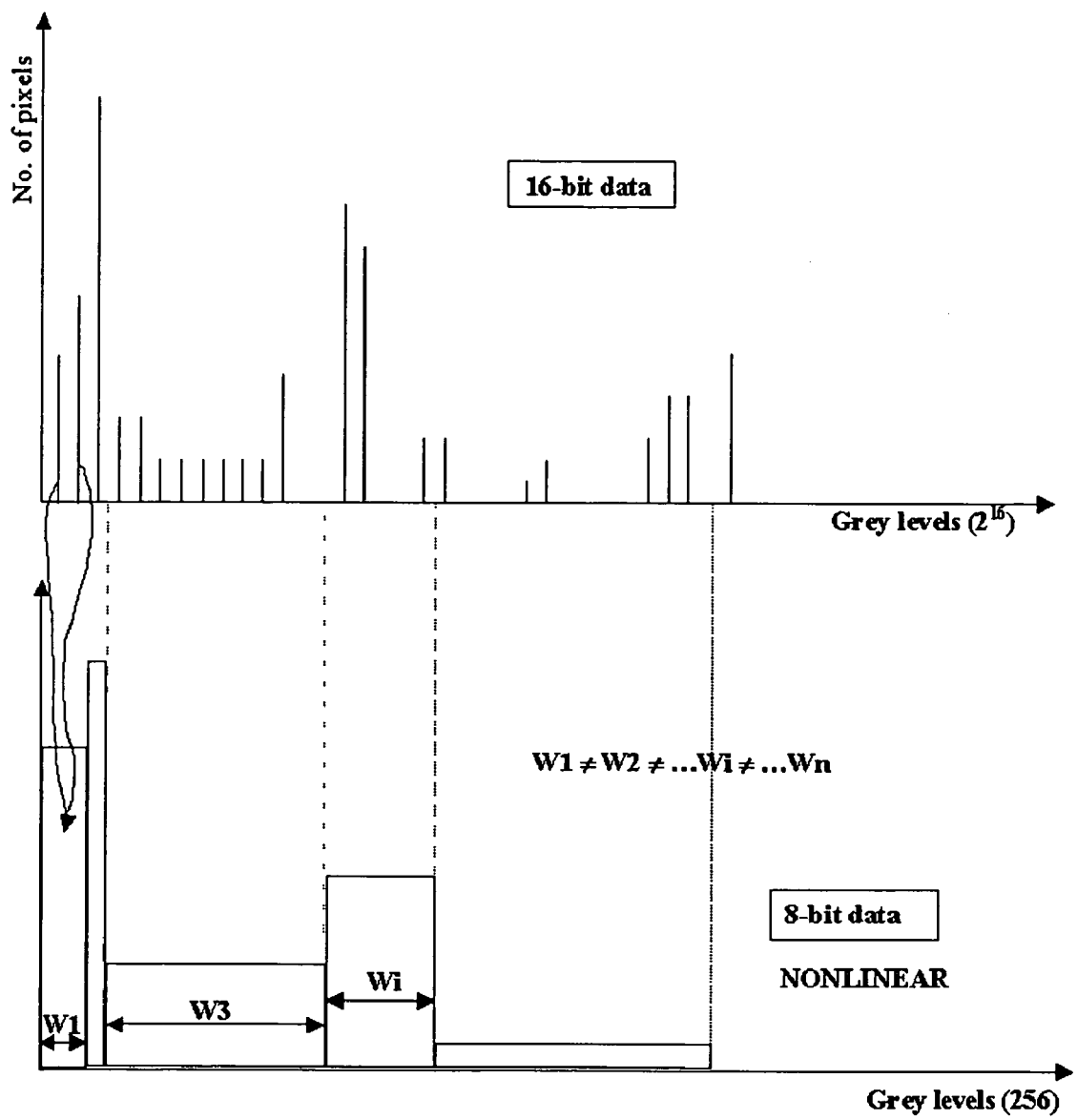
Figure 4:
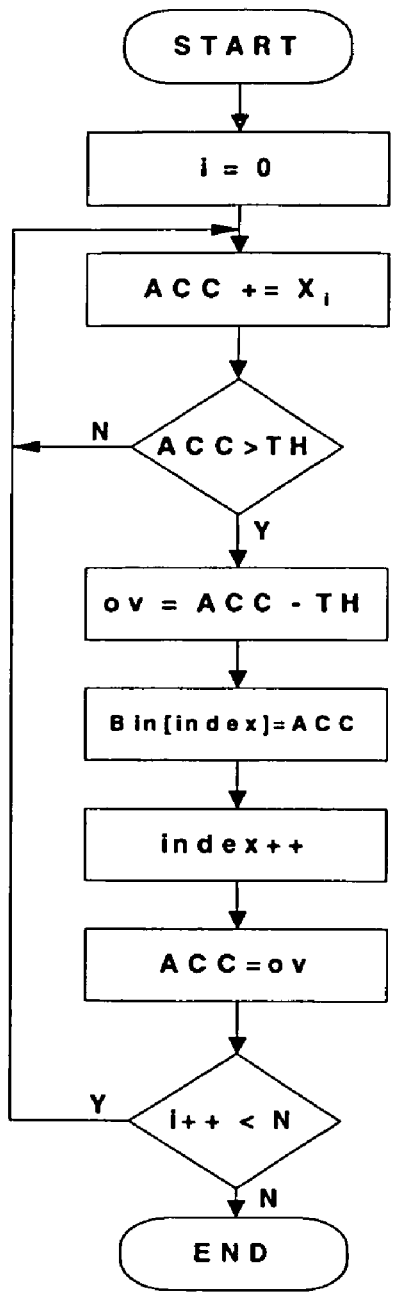
Figure 5:
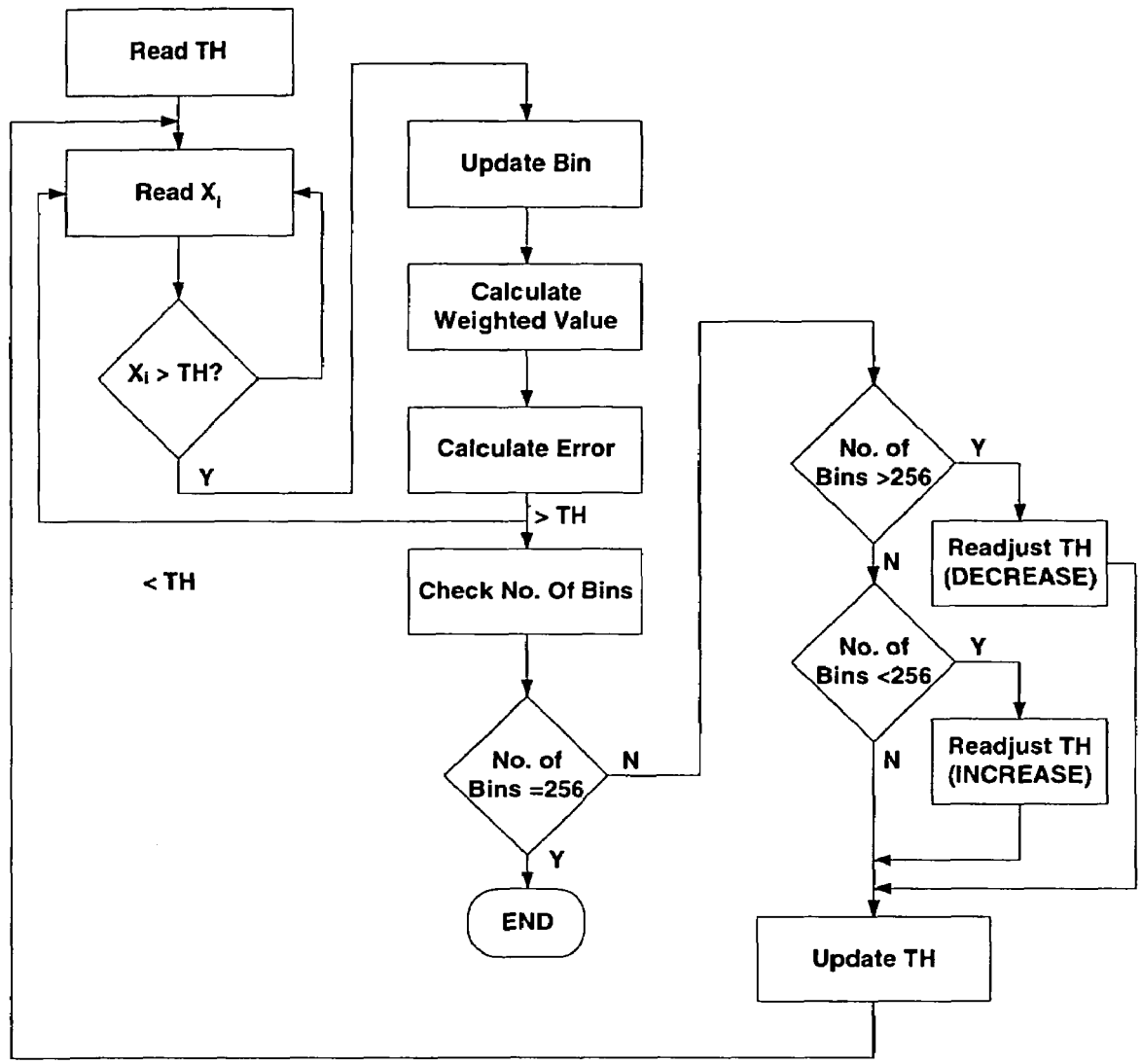

Embodiments of the invention will be described with reference to the accompanying drawings, of which:

FIG. 1 is a diagram illustrating a prior art method;
FIG. 2 is a block diagram of a prior art system;
FIG. 3 is a diagram illustrating a method according to a first embodiment of the invention;
FIG. 4 is a flow diagram illustrating a method according to a first embodiment of the invention; and
FIG. 5 is a flow diagram of a method according to a second embodiment of the invention.

According to the embodiments of the invention, the approach to estimation is to assign more quantization cells to the regions with high histogram count of depth values and approximate the resulting mapping function with higher accuracy.

An example of the general block diagram of the non-linear quantization from 16-bit data to 8-bit data is given in FIG. 3. The resulting 256 bins will be non-equally spaced containing the same number of pixels and having different width.

The procedure of building the bins applicable to each of the field/frame in the depth video sequence is as shown in FIG. 3 and described below.

From a 16-bit frame/field of the depth map in the video sequence, a 16-bit depth histogram, namely H16 is produced. This histogram contains $2^{16}$ numbers of bins, each bin having the width equal to 1. This is equal to the number of grey levels possible to be encountered in a 16-bit data representation. Hence H16 is a representation of the total number of pixels for each intensity level in the 16-bit image.

We introduce the following notations:

$H_i$ represents the number of pixels at each level i in the 16 bit data as follows:

$$i=[0\ 1\ 2\ \ldots j\ j+1\ \ldots\ 65535]$$

$$H_i=[H_0\ H_1\ H_2\ \ldots H_j\ H_{j+1}\ \ldots H_{65535}]$$

$f:i \rightarrow H_i$ represents the PDF (Probability Density Function) of H16

H8 represents the 8-bit histogram to be derived from the 16-bit depth map.

$h_m$ represents the number of pixels at each level m in the 8 bit data as follows:

$$m=[0\ 1\ 2\ \ldots n\ n+1\ \ldots\ 255]$$

$$h_m=[h_0\ h_1\ h_2\ \ldots h_n\ h_{n+1}\ \ldots h_{255}]$$

In order to build H8, the array Hi is checked for non-zero values to take into account only the existing depth value in the image. Approximately the same number of pixels is assigned to each bin in the 8-bit histogram. To this end, a threshold value equivalent to $TH=Width \times Height/256$ is chosen, where Width and Height represent the dimensions of the depth image.

The process of distributing (mapping) pixels from the H16 to H8 is carried out by adding up the consecutive values of $H_i$ until the threshold value is reached. If the checked non-zero value $H_i$ is greater then the threshold, all the pixels $H_i$ fill the corresponding bin $B_m$ in the 8-bit histogram. Moreover, at this stage, an overflow is calculated to keep an indication of the number of pixels overfloating the threshold value. This overflow value is taken into account when filling the next bin where it represents the starting value in calculating the number of pixels in this current bin. This means that, a counter variable used to count the number of pixels in the current bin will start at a non-zero value, specifically the value of overflow. This is a reference value only in order to keep the statistic of the pixels in the image, since no transfer of pixels takes place when the threshold value is overflown.

If the checked non-zero value $H_i$ is less then the threshold, then this value is added to the next value $H_{i+1}$ and so on filling an accumulator until the sum becomes greater than the threshold. In this situation, the entire sum of pixels added up so far will fill the bin $B_m$. The procedure continues until all the bins in the H8 will be filled.

Based on this approach, the method of assigning pixels from the n-bit data to the 8-bit histogram can simply be described as shown in FIG. 4.

In FIG. 4:
ov=overflow;
ACC=accumulator;
N=number of bit/pixel in the original depth data
i, index=counters
$X_i$=number of pixels in bin i in original depth data.

Experiments have been carried out comparing linear quantization, as in the prior art, with non-linear quantization as in the above embodiments of the present invention. More specifically, sequences of images were quantized from 16-bit to 8-bit using each of linear quantization and non-linear quantization and dequantized accordingly. The PSNR (peak signal to noise ratio) of the reconstructed image sequences in each case were calculated and compared. These experiments showed that on average the PSNR using non-linear quantization was greater than for linear quantization. $NL_{PSNR} > L_{PSNR}$ Although overall, the PNSR is better using non-linear quantization, it has been found that for some frames, the PSNR may be better for linear quantization. Further examination suggested that this may be related to situations where the width of a bin is extremely large and where there may be a small number of isolated pixels situated at the edge of the bins. These particular bins are far from the weighted value of the bin. Since the weighted value represents the estimated value when re-mapping back to 16-bit, those isolated pixels may introduce an error in the reconstructed 16-bit image. The further away from the weighted value, the larger the error is.

These errors can be reduced if we introduce a limit to the width of the bin. The following statistics were drawn from experiments.

TABLE 1

Experimental observation

| $B_{NL} > B_L$ | $PSNR_{NL} > PSNR_L$ |
|---|---|
| 10 times | approx. +7 dB |
| 25 times | approx. +3 dB |
| 40 times | approx. −3 dB |

$B_{NL}$ = the width of the bin in the Non-linear quantizer
$B_L$ = the width of the bin in the Linear quantizer Based on this observation, a threshold value has been used to limit the size of a bin in the NL quantizer.

In some cases, for a particular distribution of the original n-bit depth map data, say for example when same of the resultant bins are extremely large, further steps are required. This refers to a checking stage introduced to verify the size of each of the 256 resultant bins ($B_m$) in the H8 histogram. This will imply that a large bin, whose width is bigger than a chosen threshold will be split into smaller bins. Since the final number of bins should not be higher then 256, a new threshold value defining the number of pixels in each re-arranged bin is calculated and a new re-mapping is applied.

The description of the algorithm is as follows:
Step1. Calculate a pixel threshold value $TH1_{pixel}$=Width× Height/256. Assign to each of the Bin in the 8-bit histogram a number of pixels related to $TH1_{pixel}$ pixels (see the method of assigning pixels above).
Step2. Cheque the width of each bin $B_{8i}$; if this is greater than a threshold $TH_{width}$, mark those bins for splitting (NoBinsForSplit) and calculate the numbers of pixels contained in these bins (ACC). Split these bins in equal-width bins.
Step3. Calculate a new pixel threshold value $TH2_{pixel}$= (TotalNoOfPixels-ACC)/(256-NoBinsForSplit). Assign to each new bin $TH2_{pixel}$ pixels.

This can be a non-linear recursive implementation where the size of the bins is re-updated based on the volume (number of pixels in each bin) and width of the bin simultaneously until a final number of 256 bins is reached.

For each bin a representative value is calculated, that can be either the average value of the bin or the weighted average value of the bin, which will be used in the de-quantization process. The weighted average value is:

$$Val = \frac{\sum H_i * N_i}{\sum N_i} \quad (4)$$

where:
$H_i$ represents the grey level value with $i \in \{0 \ldots 65535\}$
$N_i$ represents the number of pixels with grey level value $H_i$ A second embodiment involves non-linear quantization with pixels clustering.

In this approach, the size of the non-linear bins is decided by minimizing an error measure in each bin. In the original n-bit histogram, pixels will be grouped (clustered) into bins based on error measurement. The error is calculated as a sum of squared differences between the pixels in the bin and the representative weighted value of the bin. This is a recursive implementation in which a threshold value (error threshold) is re-updated until a final number of bins equal to 256 is reached.

The array of weighted values calculated in the quantization stage will be used in the de-quantization process for re-mapping from 8-bit to n-bit (with n>8) depth data.

A flow diagram illustrating this method is shown in FIG. 5.

The PSNR values after re-mapping show that for all frames in both video sequences tested the PSNR values corresponding to the NL quantizer are higher than their Linear equivalent. An average gain of 2.5 dB is obtained by using the NL quantizer when limiting the width of the bin.

In a third embodiment, an algorithm based on Max-Lloyd quantizer for optimal scalar quantization can be used (see David S. Taubman and Michael W Marcellin, "*JPEG*2000: *Image Compression Fundamentals, Standards and Practice*". Boston, Kluwer Academic Publishers, 2002(pp. 98-101).

The quantizer takes an n-bit depth-map (x) as input and maps it to 256-level ($L_i$ corresponding to each bin $B_i$) so that distortion D is minimised; where $$Q(x) \in \{L_1, L_2, \ldots, L_{256}\}$$

$$D = \int (x - Q(x))^2 f(x) dx$$

The quantizer is optimum when it satisfies two conditions:
(i) Q must be a nearest neighbor quantizer. This means that the quantized value Q(x) for any real x must be a quantization level in $\{L1; L2; :::; L_{256}\}$ which is at least as close to x as any other quantization level:

$$|x - Q(x)| = \min_{1 \leq j \leq 256} |x - L_j|$$

(ii) Each quantization level must be the average of all samples quantized to that level:

$$L_j = \text{average\_of } \{X_i : Q(X_i) = L_j\}, j=1, \ldots, 256$$

With the above notations, the description of the Lloyd-Max algorithm is as follow:
1. Choose an initial code $C=\{L_1, L_2, \ldots, L_{256}\}$ assumed to be the values of the centroids
2. Calculate the border of each bin as midpoint between consecutive $L_i$ $$t_q = \frac{L_q + L_{q+1}}{2}$$

3. Recalculate the values of centroids $$L_q = \frac{\int_{t_q}^{t_{q+1}} x * f(x) dx}{\int_{t_q}^{t_{q+1}} f(x) dx}$$

4. Calculate distortion $D_n$ as $D = \int (x - Q(x))^2 f(x) dx$
5. If $$\frac{D_{n-1} - D_n}{D_n} < \varepsilon \text{ stop;}$$

else set n=n+1 and go to step 2

In a further implementation, local adjustment (in the spatial domain) of the mapping could be introduced to take into account:
The quality of depth estimation
The amount of texture in the region
The edges in the depth map (this would be a replacement of the approach based on ROI coding)

One possible mechanism for this in an MPEG-like codec would be to pre-define a set of mappings in the picture header and switch between them on the macroblock level.

The non-linear quantization/de-quantization method proposed here relies on multiple histogram calculation, one for each frame/field in the video sequence. To reduce the amount of information to be transferred to the de-quantizer (the array of weighted values), an averaged histogram can be calculated with a corresponding array of averaged weighted values. In this case, all the frames/fields in the video sequence would refer to the averaged weighted vector in the de-quantization process. Another approach would consider an adjusted histogram, which means that we only have to calculate the histogram corresponding to the first frame/field in the video sequence, and adjust the histogram of the next frame based on differences between the frames. For the latter case one possible implementation would be to initialise the Lloyd-Max quantizer described above to the previous quantization map. Based on an appropriate distortion criterion value (e.g. MSE of corresponding reconstruction values or quantization boundaries), the system would decide whether an update of the mapping is necessary and send it differentially if necessary.

The non-linear quantization of the depth map proposed here is meant to exploit the nonlinear relation between depth and displacement and, consequently the reconstructed picture. It can be combined with the method proposed by Krishnamurty et al. in R. Krishnamurthy, B. Chai, H. Tao and S. Sethuraman, "Compression and transmission of depth maps for image-based rendering", Proc. of International Conference on Image processing (ICIP'2001), Thessaloniki, Greece, October 2001, based on reshaping of the dynamic range of depth maps by use of a scaling function.

Experiments using the second and third embodiments, for sequences of images and measurement of PSNR as described for the first embodiment, have shown that the PSNR using the NL quantizer is greater compared with a linear quantizer. In one example, for given sequence of images, an average improvement of approximately 12 dB was found for the NL quantizer with pixels clustering compared with the linear quantizer, and an extra 0.7 dB was attained by the scalar optimised quantizer.

Further experiments involved coding the 8-bit depth map using a standard codec (such as H263/DCT based or wavelet based encoder) and similarly decoding and dequantizing back to 16-bit. In one example, an average gain of approximately 0.6 dB was found using non-linear quantization in the encoding loop compared with linear quantization.

In the specification, the term image means a whole image or a region of an image, except where apparent from the context. Similarly, a region of an image can mean the whole image. An image includes a frame or a field, and relates to a still image or an image in a sequence of images such as a film or video, or in a related group of images.

The image may be a grayscale or colour image, or another type of multi-spectral image, for example, IR, UV or other electromagnetic image, or an acoustic image etc.

The invention can be implemented for example in a computer system, with suitable software and/or hardware modifications, or similarly an encoder and/or decoder system. Aspects of the invention can be provided in software and/or hardware form, or in an application-specific apparatus or application-specific modules can be provided, such as chips. Components of a system in an apparatus according to an embodiment of the invention may be provided remotely from other components.

The invention claimed is:
1. A method of representing an image or sequence of images using a depth map comprising:
using one or more processors to perform the steps of:
requantizing an n-bit depth map representation into an m-bit depth map representation, where m<n, using a non-linear transformation, comprising transforming a depth map in the form of an n-bin histogram into a second m-bin histogram, the widths of at least two bins in the m-bin histogram being unequal, wherein the transforming comprises:
predetermining the m bins of the second histogram; and
combining bins of the first n-bin histogram by mapping pixels from one or more bins of the first histogram into a bin of the second histogram.

2. A method as claimed in claim 1 wherein more bins in the second histogram correspond to bins of the first histogram having higher histogram count.

3. A method as claimed in claim 1 wherein approximately the same number of pixels is assigned to each bin of the m-bit histogram.

4. A method as claimed in claim 1 wherein the non-linear transformation is a piecewise linear transformation, each piecewise linear transformation mapping one or more bins of the first histogram into a bin of the second histogram.

5. A method as claimed in claim 1 comprising mapping until the number of pixels in the bin of the second histogram exceeds a predetermined threshold.

6. A method as claimed in claim 5 wherein the threshold $TH = Width \times Height/2^m$ where width and height represent the dimensions of the image.

7. A method as claimed in claim 1 comprising grouping pixels into bins using an error measurement.

8. A method as claimed in claim 7 wherein the error value is the sum of squared differences between the pixels in the bin and a representative value of the bin.

9. A method as claimed in claim 1, wherein the transformation is recursive and involves intermediate transformations to one or more p-bin histograms, where p is variable.

10. A method as claimed in claim 1 using an algorithm based on a Lloyd-Max quantizer.

11. A method as claimed in claim 1 wherein m=8.

12. A method as claimed in claim 1 wherein for different areas of an image, different transformations or different quantization steps are used, based on a predetermined criterion.

13. A method as claimed in claim 1 for representing a sequence of images wherein said representation is derived for each of a plurality of images in the sequence.

14. A method as claimed in claim 1 for representing a sequence of images wherein said representation is derived for a plurality of images.

15. A method as claimed in claim 14 comprising combining depth map histograms for the plurality of images and deriving the m-bit depth map representation from the combined histogram.

16. A method as claimed in claim 1 for representing a sequence of images comprising comparing the depth map for a first image with the depth map for a second image and determining the representation for the first image based on the comparison.

17. Control device programmed to perform a method as claimed in claim 1.

18. A computer program embodied on a computer-readable medium, the computer program for executing a method as claimed in claim 1.

19. A method as claimed in claim 8, wherein the representative value of the bin is a representative weighted value of the bin.

20. Apparatus for representing an image or sequence of images using a depth map comprising:
a requantizing unit for requantizing an n-bit depth map representation into an m-bit depth map representation, where m<n, using a non-linear transformation, comprising a transforming unit for transforming a depth map in the form of an n-bin histogram into a second m-bin histogram, the widths of at least two bins in the m-bin histogram being unequal,
wherein the transforming unit is adapted to:
predetermine the m bins of the second histogram; and
combine bins of the first n-bin histogram by mapping pixels from one or more bins of the first histogram into a bin of the second histogram.

21. Apparatus as claimed in claim 20 comprising one or more of storage means storing images and/or descriptors of images, display means for displaying images, input means for inputting images, coding and/or decoding means, transmitting and/or receiving means for transmitting and/or receiving images, processing means, storage means storing instructions for executing a method of claim 1.

* * * * *